No. 849,239. PATENTED APR. 2, 1907.
J. P. HILL.
DUST PAN.
APPLICATION FILED OCT. 10, 1906.
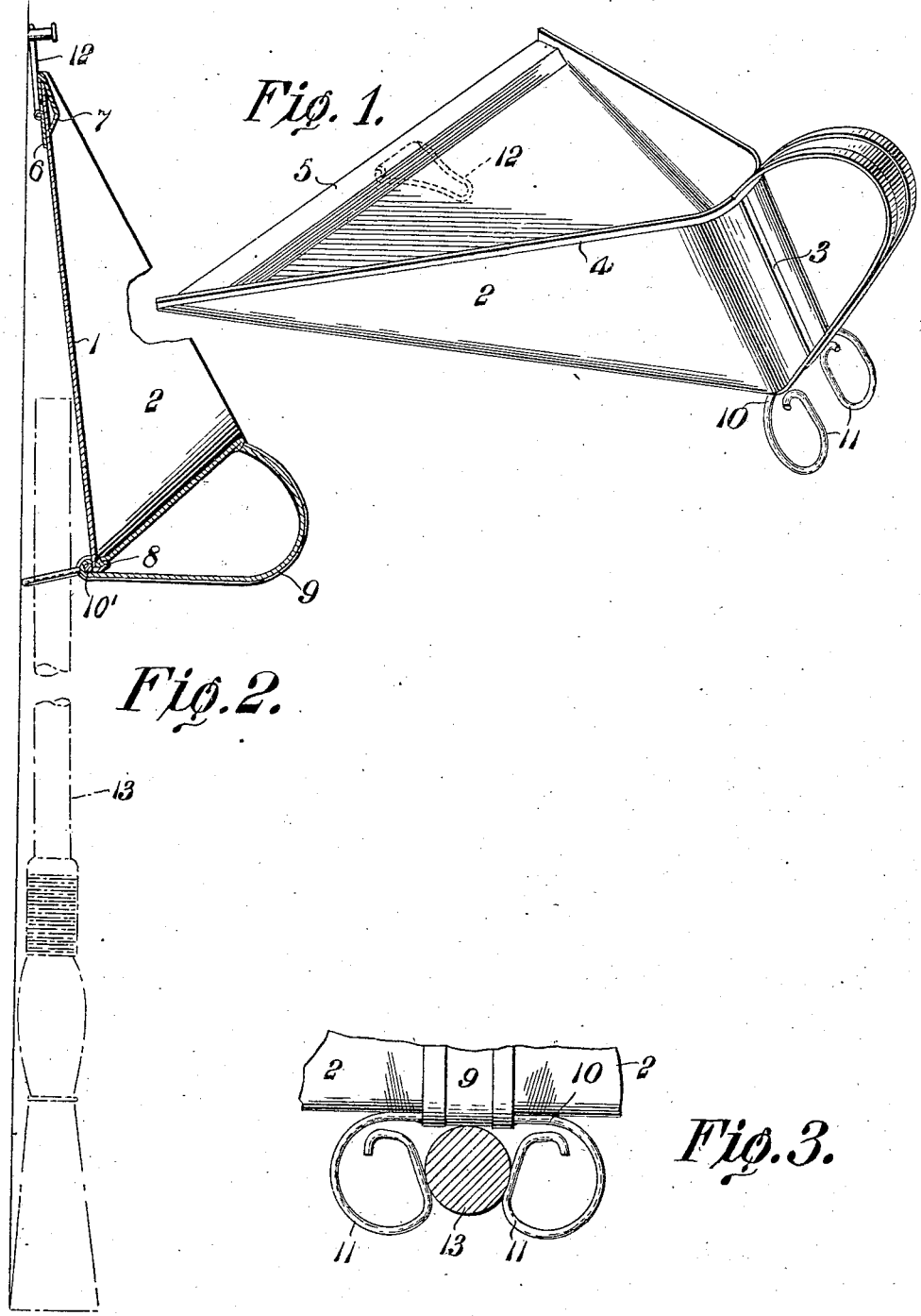
WITNESSES:
John P. Hill, INVENTOR.
By C. A. Snow & Co
ATTORNEYS

UNITED STATES PATENT OFFICE.

JOHN P. HILL, OF PHELPS, NEW YORK.

DUST-PAN.

No. 849,239.   Specification of Letters Patent.   Patented April 2, 1907.

Application filed October 10, 1906. Serial No. 338,288.

*To all whom it may concern:*

Be it known that I, JOHN PETER HILL, a citizen of the United States, residing at Phelps, in the county of Ontario and State of New York, have invented a new and useful Dust-Pan, of which the following is a specification.

This invention relates to dust-pans; and its object is to provide a device of this character which is formed of very few parts and is therefore simple and durable in construction.

A still further object is to provide a dust-pan having means whereby the same can be easily manipulated and whereby it will extend at an incline from the floor when placed in position thereon.

Another object is to provide means for preventing the pan from slipping while dust, &c., is being swept thereinto.

With the above and other objects in view the invention consists of certain novel features of construction and combinations of parts, which will be hereinafter more fully described, and pointed out in the claims.

In the accompanying drawings is shown the preferred form of the invention.

In said drawings, Figure 1 is a perspective view of the pan. Fig. 2 is a longitudinal section showing the same in use as a broom-holder. Fig. 3 is an elevation of the broom-engaging clip.

Referring to the figures by characters of reference, 1 is the substantially triangular base of the pan, the upstanding sides 2 of which are connected at the rear of the pan by a seam 3, the connected sides overhanging the base to form a pocket in which material upon the pan may be collected. The edges of the sides 2 are preferably reinforced by a bead 4, formed by bending said edges backward. A guard-strip 5 is soldered or otherwise permanently secured upon the front edge of the base and extends throughout the length thereof. This guard-strip has its front edge inturned and extending under the front edge of the base, as shown at 6, while the top of the guard-strip is inclined upward and backward and has a depending portion 7, which bears upon the base 1 and is soldered or otherwise secured to it, forming a shoulder which serves to prevent material upon the pan from sliding therefrom while the pan is in an inclined position. The rear end of the base and the adjoining portions of the sides 2 are folded, as at 8, so as to completely close the pan at this point.

In order that the pan may be readily manipulated, a handle is provided, which consists of a crooked or curved strip 9, fastened at one end to the center of the upper edge of the pocket and at its other end to the fold 8. Secured to the fold adjacent the end of the handle 9 is a wire 10, said wire being surrounded by the end of the handle, as shown at 10'. The ends of this wire are turned inward, as shown at 11, so as to form clips. Said inturned portions also constitute supports for holding the bottom of the pan in an inclined position. A loop 12 is pivotally connected to the bottom of the pan at a point removed from its front edge and is adapted to normally extend backward and rest against the bottom of the pan. In using this pan it is merely necessary to place it upon the floor, and the supports 11 will hold it in an inclined position. Dirt can then be swept into the pan over the inclined strip 5 and into the pocket formed upon the pan. Shoulders 7 will prevent the contents of the pan from slipping therefrom. Not only do the supports 11 hold the pan in an inclined position, but they also prevent the pan from slipping, and it does not become necessary to stoop while sweeping into the pan. When the pan is not in use, it can be suspended by means of the loop 12, as shown in Fig. 2, and the inturned portions 11 of the supporting-wire 10 can be employed as a clip for engaging and holding a broom 13.

The preferred form of the invention has been set forth in the foregoing description; but I do not limit myself thereto, as I am aware that modifications may be made therein without departing from the spirit or sacrificing the advantages thereof, and I therefore reserve the right to make such changes as fairly fall within the scope of the claims.

What is claimed is—

1. A dust-pan comprising a body, a handle secured to one end thereof, and a spring-wire engaged between its ends and secured upon the pan by one end portion of the handle, the ends of said wire being downwardly and inwardly curved to constitute a clip, said ends being free.

2. A dust pan having a back portion inclined to the base of the pan, and a handle secured at its ends to the top of the back and to the lower face of the base of the pan, said handle being secured at an intermediate point to the lower edge of the base, and a spring-rod embraced, and secured upon the pan, by that portion of the handle below the back portion, said spring-rod forming a pan-support and having inturned ends constituting a clip.

In testimony that I claim the foregoing as my own I have hereto affixed my signature in the presence of two witnesses.

JOHN P. HILL.

Witnesses:
    S. S. PARTRIDGE,
    WILLIAM C. TOUT.